United States Patent [19]
Ueno et al.

[11] Patent Number: 4,655,844
[45] Date of Patent: Apr. 7, 1987

[54] PROCESS FOR PRODUCING AZO PIGMENTS

[75] Inventors: Ryuzo Ueno; Shigeru Itoh; Shine Fujimoto, all of Nishinomiya; Yumiko Komatsu, Takarazuka; Hiroaki Tsuchiya, Kobe, all of Japan

[73] Assignee: Kabushiki Kaisha Ueno Seiyaku Oyo Kenkyujo, Osaka, Japan

[21] Appl. No.: 827,447

[22] Filed: Feb. 10, 1986

[30] Foreign Application Priority Data

Feb. 8, 1985 [JP] Japan ................................. 60-21845
Dec. 13, 1985 [JP] Japan ................................. 60-279136
Dec. 13, 1985 [JP] Japan ................................. 60-279137

[51] Int. Cl.$^4$ ............................................. C04B 11/00
[52] U.S. Cl. ................................. 106/309; 106/288 Q
[58] Field of Search ......................... 106/288 Q, 309

[56] References Cited

U.S. PATENT DOCUMENTS

| 4,190,578 | 2/1980 | Hamilton | 106/288 Q |
| 4,217,273 | 8/1980 | Von | 8/639 |
| 4,474,609 | 10/1984 | Ehl et al. | 106/309 |
| 4,491,481 | 1/1985 | Robertson et al. | 106/23 |
| 4,497,735 | 2/1985 | Olsen et al. | 106/309 |
| 4,530,724 | 7/1985 | Ueno et al. | 106/309 |
| 4,535,151 | 8/1985 | Fournier | 106/23 |

Primary Examiner—Paul Lieberman
Assistant Examiner—Willie J. Thompson
Attorney, Agent, or Firm—Sherman and Shalloway

[57] ABSTRACT

A process for producing an azo pigment, which comprises coupling an aromatic diazonium compound with 3-hydroxy-2-naphthoic acid and at least one bis-naphthylmethane, and optionally, making the resulting pigment.

4 Claims, No Drawings

PROCESS FOR PRODUCING AZO PIGMENTS

This invention relates to an improvement in processes for producing azo pigments through the coupling of an aromatic diazonium compound with 3-hydroxy-2-naphthoic acid. More particularly, the invention pertains to a process for producing the azo pigments which are toned.

The term "toning" as used in this invention denotes "to provide pigments, by some means, with controlled properties or characteristics in terms of, for example, hue, brilliance, transparency and hiding power".

Azo pigments obtained by using 3-hydroxy-2-naphthoic acid as a coupling component are well known. Examples include Brilliant Carmine 6B (Pigment Red 48) and Watchung Red (Pigment Red 57), which are obtained by coupling diazonium salts of 6-amino-m-toluenesulfonic acid and 6-amino-4-chloro-m-toluenesulfonic acid, respectively, with 3-hydroxy-2-naphthoic acid. These azo pigments find extensive application in a great variety of fields inclusive of, principally, printing inks, paints, oil and water colors, plastics and cosmetics. In these application fields, a widened range of performance is required for the pigments. For example, enhanced brilliance and transparency are required for pigments intended for use in printing inks, and improved durability and hiding power are required for those to be used in paints, whereas increased heat resistance is needed for those to be utilized in plastics. In producing even pigments of the same chemical structure, therefore, it is necessary to prepare such pigments exhibiting properties or characteristics which fit in well with their intended application fields.

The color and other properties of a pigment are in principle the attributes of its chemical structure, but its characteristics, such as brilliance, transparency and hiding power, change as well depending upon physical factors of the pigment, such as the fineness, form and shape and surface conditions of its particles. By altering manufacturing steps or utilizing such additives as wood rosin, for example, characteristics of pigments can be regulated or controlled to a limited extent but not to a satisfactory degree. On the other hand, it is also known to control the color and physical properties of pigments by replacing 3-hydroxy-2-naphthoic acid as a coupling component in part with a suitable amount of a toning compound, and the specifications of Japanese Laid-Open Patent Publications Nos. 116753/1981 and 42662/1983 describe several compounds as a toning agent. Nevertheless, these toning agents have turned out to demonstrate only unsatisfactory toning effects.

The present invention has for its object the provision of a process which, as a result of finding toning compounds capable of providing pigments with controlled hues as desired, can permit the production of azo pigments toned as desired.

This object of the invention is achieved by replacing 3-hydroxy-2-naphthoic acid in part with particular bis-naphthylmethanes.

According to this invention, there is provided a process for producing toned azo pigments, which comprises coupling an aromatic diazonium compond with 3-hydroxy-2-naphthoic acid and at least one bis-naphthylmethane, and optionally laking the resulting product.

In other words, the process of this invention is carried out by diazotizing an aromatic amine and coupling the resulting aromatic diazonium compound with the aforementioned coupling component (3-hydroxy-2-naphthoic acid plus the particular bis-naphthylmethane). The amount of the bis-naphthylmethane used as a toning agent is not particularly limited. Nevertheless, its use in too large amounts, in some instances, causes the resulting pigment to produce a color different from its natural, inherent color and also to suffer from reduction or deterioration in water resistance, which is considered as one of the important functions as a pigment. In view of the above coupled with economy, etc., it is generally desirable to use the bis-naphthylmethane in amounts of 0.1 to 10 weight. %, particularly 0.2 to 2.0 weight. %. Diazotization and coupling can be carried out in accordance with conventional procedures.

Examples of the aroamtic amine that can be used in the process of this invention include 6-amino-4-chloro-m-toluenesulfonic acid, 2-amino-5-chloro-p-toluenesulfonic acid, 2-amino-4-chlorobenzoic acid, 6-amino-m-toluenesulfonic acid, 5-amino-2-chlorobenzenesulfonic acid, 2-aminonaphthalene -1-sulfonic acid, and aniline.

The process of this invention gives various toned azo pigments, such as Pigment Red 48, Pigment Red 52, Pigment Red 55, Pigment Red 57, Pigment Red 58, Pigment Red 63 and Pigment Red 64, according to the types and amounts of the aromatic amine and bis-naphthylmethane used.

Calcium salts, barium salts, strontium salts and manganese salts, for example, may be used as laking agents. Laking may be carried out in a customary manner.

The bis-naphthylmethanes used in this invention are preferably compounds having a basic skeleton represented by the following formula

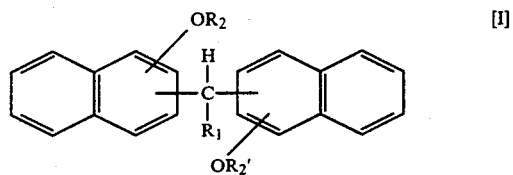

wherein $R_1$, $R_2$ and $R_2'$, independently from each other, represent a hydrogen atom or an alkyl group having not more than 5 carbon atoms.

More specifically, bis-naphthylmethanes having the basic skeleton of general formula [I] above are roughly divided into two groups. A first group includes compounds represented by the following general formulae

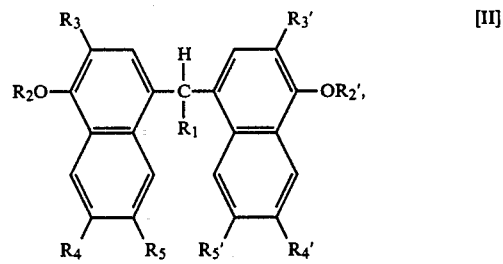

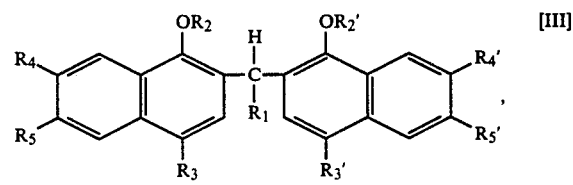

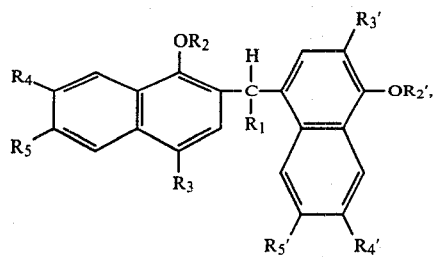 [IV]

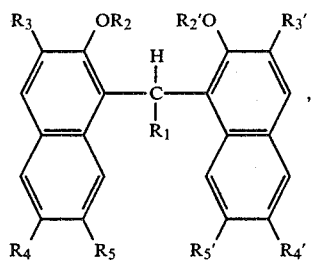 [V]

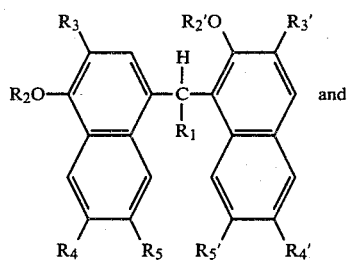 [VI]

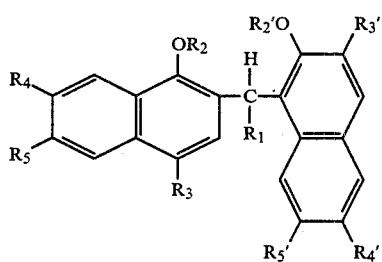 [VII]

In these formulae, $R_1$, $R_2$ and $R_2'$, independently from each other, represent a hydrogen atom or an alkyl group having not more than 5 carbon atoms; $R_3$ and $R_3'$, independently from each other, represent a hydrogen atom, a halogen atom, an alkyl group having not more than 5 carbon atoms, an alkoxycarbonyl group with the alkyl moiety having not more than 5 carbon atoms, a carboxyl group, a nitro group, a sulfone group or a group of the formula —CONH—$R_6$ in which $R_6$ represents the group

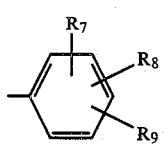

or the group

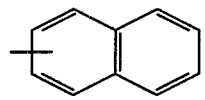

where $R_7$, $R_8$ and $R_9$, independently from each other, represent a hydrogen atom, a halogen atom, an alkyl group having not more than 5 carbon atoms, an alkoxy and an alkoxycarbonyl groups with the alkyl moiety having not more than 5 carbon atoms, a carboxyl group, a nitro group or a sulfone group; and $R_4$, $R_4'$, $R_5$ and $R_5'$, independently from each other, represent a hydrogen atom, a halogen atom, an alkyl group having not more than 5 carbon atoms, an alkoxy and an alkoxycarbonyl groups with the alkyl moiety having not more than 5 carbon atoms, a carboxyl group, a nitro group or a sulfone group.

According to one embodiment of the process of this invention, at least one compound selected from this group is used as a toning agent.

Bis-naphthylmethanes of general formulae [II] to [VII] in which $R_3$ and $R_3'$ are the atoms or groups other than the group —CONH—$R_6$ are obtained by condensing naphthols with aldehydes. Examples of the naphthols include 1-naphthol, 2-naphthol, methyl-1-naphthol, methyl-2-naphthol, chloro-1-naphthol, chloro-2-naphthol, bromo-1-naphthol, bromo-2-naphthol, 1-naphtholsulfonic acid, 2-naphtholsulfonic acid, nitro-1-naphthol, nitro-2-naphthol, 1-methoxynaphthalene, 2-methoxynaphthalene, 1-methoxy-2-naphthoic acid, 2-methoxy-1-naphthoic acid, 2-methoxy-3-naphthoic acid, 2-methoxy-6-naphthoic acid, 1-hydroxy-2-naphthoic acid, 2-hydroxy-1-naphthoic acid, 2-hydroxy-3-naphthoic acid, 2-hydroxy-6-naphthoic acid, 1-hydroxy-2-naphthoic acid esters, 2-hydroxy-1-naphthoic acid esters, 2-hydroxy-3-naphthoic acid esters and 2-hydroxy-6-naphthoic acid esters. Examples of the aldehyde are formaldehyde, acetaldehyde, propionaldehyde and butyraldehyde. Formaldehyde is particularly preferred.

Specific examples of the bis-naphthylmethanes obtained by the condensation of naphthols with aldehydes include
4,4'-dihydroxy-1,1'-dinaphthylmethane,
4,4'-dihydroxy-3-chloro-1,1'-dinaphthylmethane,
4,4'-dihydroxy-3-methyl-1,1'-dinaphthylmethane,
4,4'-dihydroxy-6-methyl-1,1'-dinaphthylmethane,
4,4'-dihydroxy-7-methyl-1,1'-dinaphthylmethane,
4,4'-dihydroxy-1,1'-dinaphthylmethane-3,3'-dicarboxylic acid,
1,1'-dihydroxy-2,2'-dinaphthylmethane,
1,1'-dihydroxy-2,2'-dinaphthylmethane-4,4'-dicarboxylic acid,
1,1'-dihydroxy-4,4'-dichloro-2,2'-dinaphthylmethane,
1,4'-dihydroxy-2,1'-dinaphthylmethane,
4,1'-dihydroxy-1,2'-dinaphthylmethane-3-carboxylic acid,
2,2'-dihydroxy-1,1'-dinaphthylmethane,
2,2'-dihydroxy-1,1'-dinaphthylmethane-3,3'-dicarboxylic acid,
2,2'-dihydroxy-1,1'-dinaphthylmethane-6,6'-dicarboxylic acid,
2,2'-dihydroxy-1,1'-dinaphthylmethane-3,6'-dicarboxylic acid,
2,2'-dihydroxy-1,1'-dinaphthylmethane-3-carboxylic acid, 2,2'-dihydroxy-1,1'-dinaphthylmethane-6-carboxylic acid,
2,2'-dihydroxy-3-chloro-1,1'-dinaphthylmethane,
2,2'-dihydroxy-3-nitro-1,1'-dinaphthylmethane,
2,2'-dihydroxy-1,1'-dinaphthylmethane-3-sulfonic acid,
2,2'-dihydroxy-3-methyl-1,1'-dinaphthylmethane,
2,2'-dihydroxy-6-methyl-1,1'-dinaphthylmethane,
2,2'-dihydroxy-7-methyl-1,1'-dinaphthylmethane,
methyl 2,2'-dihydroxy-1,1'-dinaphthylmethane-3-carboxylate,
2,2'-dimethoxy-1,1'-dinaphthylmethane-3,3'-dicarboxylic acid,
2-hydroxy-2'-methoxy-1,1'-dinaphthylmethane-3-carboxylic acid,
2,4'-dihydroxy-3-chloro-1,1'-dinaphthylmethane,
2,4'-dihydroxy-3-methyl-1,1'-dinaphthylmethane,
2,4'-dihydroxy-1,1'-dinaphthylmethane-3-carboxylic acid,
2,4'-dihydroxy-1,1'-dinaphthylmethane-6-carboxylic acid,
1,2'-dihydroxy-2,1'-dinaphthylmethane,
2,1'-dihydroxy-1,2'-dinaphthylmethane-3-carboxylic acid,
2,1'-dihydroxy-1,2'-dinaphthylmethane-6-carboxylic acid, and
2,1'-dihydroxy-3-chloro-1,2'-dinaphthylmethane.

Bis-naphthylmethanes of general formulae [II] to [VII] in which $R_3$ and $R_3'$ each represent the group —CONH—$R_6$ can be obtained by condensing naphthalenecarboxamides with aldehydes.

Examples of the naphthalenecarboxamides include
3-hydroxy-N-phenyl-2-naphthalenecarboxamide,
1-hydroxy-N-phenyl-2-naphthalenecarboxamide,
3-hydroxy-N-(2-methylphenyl)-2-naphthalenecarboxamide,
3-hydroxy-N-(4-methylphenyl)-2-naphthalenecarboxamide,
3-hydroxy-N-(2-methoxyphenyl)-2-naphthalenecarboxamide,
3-hydroxy-N-(2-ethoxyphenyl)-2-naphthalenecarboxamide,
3-hydroxy-N-(4-methoxyphenyl)-2-naphthalenecarboxamide,
3-hydroxy-N-(4-chlorophenyl)-2-naphthalenecarboxamide,
3-hydroxy-N-(4-bromophenyl)-2-naphthalenecarboxamide,
3-hydroxy-N-(3-nitrophenyl)-2-naphthalenecarboxamide,
3-hydroxy-N-(4-nitrophenyl)-2-naphthalenecarboxamide,
3-hydroxy-N-(4-sulfophenyl)-2-naphthalenecarboxamide,
3-hydroxy-N-(2-methyl-4-chlorophenyl)-2-naphthalenecarboxamide,
3-hydroxy-N-(2-methyl-4-methoxyphenyl)-2-naphthalenecarboxamide,
3-hydroxy-N-(2,5-dimethoxyphenyl)-2-naphthalenecarboxamide,
3-hydroxy-N-(2,5-dimethoxy-4-chlorophenyl)-2-naphthalenecarboxamide,
3-hydroxy-N-(3-chloro-4,6-dimethoxyphenyl)-2-naphthalenecarboxamide,
3-hydroxy-N-1-naphthalenyl-2-naphthalenecarboxamide,
3-hydroxy-N-2-naphthalenyl-2-naphthelenecarboxamide, and
3-methoxy-N-phenyl-2-naphthalenecarboxamide.

As the aldehyde, formaldehyde, acetaldehyde, propionaldehyde and butyraldehyde as above may be cited. Formaldehyde is particularly preferred.

Specific examples of the bis-naphthylmethanes obtained by the condensation of the naphthalenecarboxamides with the aldehydes include
2,2'-dihydroxy-1,1'-dinaphthylmethane-3,3'-di-N-phenylcarboxamide,
2,2'-dihydroxy-1,1'-dinaphthylmethane-3,3'-di-N-(2-methylphenyl)carboxamide,
2,2'-dihydroxy-1,1'-dinaphthylmethane-3,3'-di-N-(2-ethoxyphenyl)carboxamide,
2,2'-dihydroxy-1,1'-dinaphthylmethane-3,3'-di-N-(4-chlorophenyl)carboxamide,
2,2'-dihydroxy-1,1'-dinaphthylmethane-3-N-(3-nitrophenyl)carboxamide-3'-N-(4-nitrophenyl)carboxamide,
2,2'-dihydroxy-1,1'-dinaphthylmethane-3,3'-di-N-(2-methyl-4-chlorophenyl)carboxamide,
2,2'-dihydroxy-1,1'-dinaphthylmethane-3,3'-di-N-(2,5-dimethoxy-4-chlorophenyl)carboxamide,
2,2'-dihydroxy-1,1'-dinaphthylmethane-3,3'-di-N-1-naphthalenylcarboxamide,
2,2'-dihydroxy-1,1'-dinaphthylmethane-3,3'-di-N-2-naphthalenylcarboxamide,
2,2'-dihydroxy-1,1'-dinaphthylmethane-3-N-1-naphthalenylcarboxamide-3'-N-2-naphthalenylcarboxamide,
2,2'-dihydroxy-1,1'-dinaphthylmethane-6-methyl-3,3'-di-N-phenylcarboxamide,
2,2'-methoxy-1,1'-dinaphthylmethane-7-chloro-3,3'-di-N-phenylcarboxamide,
1,1'-dihydroxy-2,2'-dinaphthylmethane-4,4'-di-N-phenylcarboxamide,
2,1'-dihydroxy-1,2'-dinaphthylmethane-3,4'-di-N-phenylcarboxamide, and
4,4'-dimethoxy-1,1'-dinaphthylmethane-3,3'-di-N-phenylcarboxamide.

A second group of the bis-naphthylmethane having the basic skeleton of general formula [I] includes azo compounds obtained by coupling aromatic diazonium compounds with the compounds of general formulae [II] to [VII] in a customary manner. According to another embodiment of the process of this invention, at least one azo compound selected from the second group is used as a toning agent. In this embodiment, a toned azo pigment can be produced by coupling an aromatic diazonium compound with 3-hydroxy-2-naphthoic acid and at least one said azo compound, and optionally laking the product. This embodiment has the advantage that the color of the resulting azo pigment can be very effectively toned as desired.

The aromatic diazonium compound used for preparing the azo compound can be prepared by diazotizing an aromatic amine in a customary manner. Examples of the aromatic amine are compounds similar to those exemplified above such as 6-amino-4-chloro-m-toluenesulfonic acid, 2-amino-5-chloro-p-toluenesulfonic acid, 2-amino-4-chlorobenzoic acid, 6-amino-m-toluenesulfonic acid, 5-amino-2-chlorobenzenesulfonic acid, 2-aminonaphthalene-1-sulfonic acid, and aniline.

As stated hereinabove, the process of this invention is characterized by using 3-hydroxy-2-naphthoic acid and the above-specified bis-naphthylmethane as a coupling component, or in other words by replacing a part of 3-hydroxy-2-naphthoic acid known heretofore as a coupling component by the above-specified bis-naphthylmethane as a coupling component having toning property. The process of this invention exerts desirable effects on the growth of crystals during pigment synthesis, which results in variations in natural or original color, tint, and/or transparency. The toning effects vary widely with the kind of the diazonium compound used or with the kind and amount of the bis-naphthylmethane used.

For example, when 2,2'-dihydroxy-1,1'-dinaphthylmethane-3,3'-dicarboxylic acid, 2,2'-dihydroxy-1,1'-dinaphthylmethane-3,3'-di-N-phenylcarboxamide, or an azo compound obtained by coupling 6-amino-m-toluenesulfonic acid with 2,2'-dihydroxy-1,1'-dinaphthylmethane is used for Brilliant Carmine 6B (Pigment Red 57) which is very important as a red pigment for printing inks, there are produced marked toning effects such as darkened mass tone, blued tint, brightened chroma and increased transparency. Similar toning effects can also be obtained by using 2,2'-dihydroxy-1,1'-dinaphthylmethane, 2,2'-dihydroxy-1,1'-dinaphthylmethane-6,6'-dicarboxylic acid, 2,2'-dihydroxy-1,1'-dinaphthylmethane-3,6'-dicarboxylic acid, 4,4'-dihydroxy-1,1'-dinaphthylmethane, 1,1'-dihydroxy-2,2'-dinaphthylmethane, 4,4'-dihydroxy-1,1'-dinaphthylmethane-3,3'-dicarboxylic, etc. Similar, marked toning effects are obtained with Watchung Red (Pigment Red 48), one of the important red pigments for printing inks, by using 2,2'-dihydroxy-1,1'-dinaphthylmethane.

With reference to red printing inks, the color hue of redness as well as brightness and transparency constitute important factors in assessing the inks, and there are a strong demand for red printing inks provided with enhanced brilliance and increased transparency. As is obvious from the above, the pigments obtained by the process of this invention can fully meet these requirements.

Referring to other pigments, for example, Watchung Red (Pigment Red 48), the use of 2,2'-dihydroxy-1,1'-dinaphthylmethane, 3,3'-dicarboxylic acid, 2,2'-dihydroxy-1,1'-dinaphthylmethane-3,3'-di-N-phenylcarboxamide or the azo compound produced by the coupling of 6-amino-m-toluenesulfonic acid with 2,2'-dihydroxy-1,1'-dinaphthylmethane has led the present inventors to the unexpected finding that unexpected toning effects, such as brightened original color and yellowed reflectance hue, were produced. Pigments of such a kind, for example, are suited for use in paints.

As has been stated above, the process of this invention can permit the production of differently toned azo pigments, and is therefore highly valuable from an industrial point of view, because it can produce greater toning effects than the known methods and also meet a wide variety of requirements in relation to coloring.

REFERENTIAL EXAMPLE 1

Production of a bis-naphthylmethane:

[I] 14.6 g of 2-naphthol was added to 60 g of water containing 4.1 g of sodium hydroxide, and the mixture was heated to 90° C. to form a solution. To the solution was added 4.1 g of formaldehyde, and the mixture was heated at 95° C. for 1 hour. After the reaction, the reaction mixture was precipitated with dilute sulfuric acid, and the precipitate was cooled, washed with water and dried to give 15.4 g (purity 98.7%) of 2,2'-dihydroxy-1,1'-dinaphthylmethane.

[II] 10.0 g of 3-hydroxy-2-naphthoic acid and 10.0 g of 6-hydroxy-2-naphthoic acid were added to 60 g of water containing 6.7 g of sodium hydroxide. The mixture was heated to 90° C. to form a solution. To the solution was added 5.8 g of formaldehyde, and the mixture was heated at 95° C. for 1 hour. After the reaction, the reaction mixture was precipitated with dilute sulfuric acid, and the precipitate was cooled, washed with water, and dried to give 23.7 g of while crystals. The crystals were found to contain 30.6% of 2,2'-dihydroxy-1,1'-dinaphthylmethane-3,3'-dicarboxylic acid, 22.1% of 2,2'-dihydroxy-1,1'-dinaphthylmethane-6,6'-dicarboxyloic acid and 44.9% of 2,2'-dihydroxy-1,1'-dinaphthylmethane-3,6'-dicarboxylic acid.

EXAMPLE 1

(a) 12 g of 6-amino-m-toluenesulfonic acid was dissolved in 200 ml of water containing 2.8 g of sodium hydroxide. To the solution was added 15 g of 35% hydrochloric acid to form a precipitate. A solution of 4.4 g of sodium nitrile in 20 ml of water was added dropwise while maintaining it at a temperature of 0° C., followed by diazotization with stirring for 1 hour to give a diazonium salt solution. Separately, 12.2 g of 3-hydroxy-2-naphthoic acid was dissolved in 150 ml of water containing 7.3 g of sodium hydroxide, and the solution was maintained at 0° C. The diazonium salt solution as prepared was gradually added to the solution, and the mixture was stirred for 2 hours to perform coupling. After the reaction, 70 ml of water was added, and the pH of the solution was adjusted to 8.0-8.5 with a 10% aqueous solution of acetic acid. Then, a solution of 9.1 g of calcium chloride in 40 ml of water was added to the solution while mantaining it at 18° C. The mixture was heated to 90° C., stirred for 30 minutes, and filtered. The precipitate was collected, washed with water and dried to give a calcium salt of Brillinat Carmine 6B.

(b) A pigment toned in accordance with the process of the invention was produced by the process of this invention by repeating the above procedure (a) except that 3-hydroxy-2-naphthoic acid containing 1 or 2% by weight of 2,2'-dihydroxy-1,1'-dinaphthylmethane-3,3'-dicarboxylic acid (toning agent A) was used instead of 3-hydroxy-2-naphthoic acid.

(c) A toned pigment for comparison was produced by operating in the same way as in the above procedure (a) except that 3-hydroxy-2-naphthoic acid containing 2% by weight of 2,2'-dihydroxy-3,3'-dicarboxy-1,1'-dinaphthyl (toning agent B; see Japanese Laid-Open Patent Publication No. 116753/1981) was used instead of 3-hydroxy-2-naphthoic acid.

In a Hoover muller, the resulting pigments were kneaded individually with No. 4 varnish in the amount as stipulated by the Japanese Industrial Standard specification, and the pigment samples containing a toning agent and the standard sample were spread side by side to evaluate the toning effect. The respective pigments obtained were measured for dominant wavelength ($\lambda d$), lightness (Y) and excitation purity (Pe). The results are shown in Table 1.

TABLE 1

| Toning agent | wt. % of the toning agent | $\lambda d$ (nm) | Y (%) | Pe (%) | Mass tone | Tint |
| --- | --- | --- | --- | --- | --- | --- |
| None | — | 494.0 C | 6.7 | 62.7 | Standard | Standard |
| A | 1.0 | 494.8 C | 5.6 | 67.2 | Very dark | Moderately more blue |
| A | 2.0 | 495.0 C | 5.5 | 67.3 | Extremely dark | Much more blue |
| B | 2.0 | 494.3 C | 6.6 | 63.4 | Slightly | Slightly |

TABLE 1-continued

| Toning agent | wt. % of the toning agent | λd (nm) | Y (%) | Pe (%) | Mass tone | Tint |
|---|---|---|---|---|---|---|
| | | | | | dark | more blue |

EXAMPLE 2

A barium salt of Brilliant Carmine 6B was produced by repeating Example 1, (a) except that barium chloride was used as the laking agent.

Toned pigments were produced by operating in the same way as in the above procedure of pigment production except that 1% by weight or 2% by weight of 3-hydroxy-2-naphthoic acid was replaced by 2,2'-dihydroxy-1,1'-dinaphthylmethane-3,3'-dicarboxylic acid.

The toning effects of the pigments obtained were evaluated as in Example 1, and their dominant wavelengths, lightnesses and excitation purities were measured. The results are shown in Table 2.

TABLE 2

| Toning agent (wt. %) | λd (nm) | Y (%) | Pe (%) | Mass tone | Tint |
|---|---|---|---|---|---|
| — | 494.4 C | 5.1 | 77.8 | Standard | Standard |
| 1.0 | 495.0 C | 4.3 | 79.5 | Fairly dark | Moderately more blue |
| 2.0 | 495.1 C | 4.2 | 79.6 | Very dark | Moderately more blue |

EXAMPLE 3

A calcium salt of Watchung Red was produced by coupling a dizaonium salt of 6-amino-4-chloro-m-toluenesulfonic acid with 3-hydroxy-2-naphthoic acid by the same operation as in Example 1, (a).

Toned pigments were produced in the same way as in the above operation of pigment production except that 1% by weight or 2% by weight of 3-hydroxy-2-naphthoic acid was replaced by 2,2'-dihydroxy-1,1'-dinaphthylmethane-3,3'-dicarboxylic acid.

The toning effects of the resulting pigments were evaluated in the same way as in Example 1, and their dominant wavelengths, lightnesses and excitation purities were also measured. The results are shown in Table 3.

TABLE 3

| Toning agent (wt. %) | λd (nm) | Y (%) | Pe (%) | Mass tone | Tint |
|---|---|---|---|---|---|
| — | 494.0 C | 6.7 | 67.4 | Standard | Standard |
| 1.0 | 493.3 C | 7.3 | 63.6 | Very slightly bright | Slightly more yellow |
| 2.0 | 493.3 C | 7.3 | 63.6 | Slightly bright | Slightly more yellow |

EXAMPLE 4

A calcium salt of Brillinat Carmine 6B was produced in the same way as in Example 1, (a).

Toned pigments were produced in the same way as in the above operation of pigment production except that 2% 2% by weight or 10% by weight of 3-hydroxy-2-naphthoic acid used was replaced by 2,2'-dihydroxy-1,1'-dinaphthylmethane.

The toning effects of the resulting pigments were evaluated in the same way as in Example 1, the results are shown in Table 4.

TABLE 4

| Toning agent (wt. %) | Mass tone | Tint | Transparency |
|---|---|---|---|
| — | Standard | Standard | Standard |
| 2.0 | Very dark | Very blue | Very transparent |
| 10.0 | Extremely dark | Extremely blue | Extremely transparent |

EXAMPLE 5

A calcium salt of Watchung Red was produced by coupling a diazonium salt of 6-amino-4-chloro-m-toluenesulfonic acid with 3-hydroxy-2-naphthoic acid by the same operation as in Example 1, (a).

Toned pigments were produced in the same way as in the above operation of pigment production except that 2% by weight or 10% by weight of 3-hydroxy-2-naphthoic acid used was replaced by 2,2'-dihydroxy-1,1'-dinaphthylmethane.

The toning effects of the resulting pigments are shown in Table 5.

TABLE 5

| Toning agent (wt. %) | Mass tone | Tint | Transparency |
|---|---|---|---|
| — | Standard | Standard | Standard |
| 2.0 | Very dark | Very blue | Very transparent |
| 10.0 | Extremely dark | Extremely blue | Extremely transparent |

EXAMPLE 6

A calcium salt of Brilliant Carmine 6B was produced in the same way as in Example 1, (a).

Toned pigments were produced by operating in the same way as in the above pigment production except that 1% by weight or 2% by weight of 3-hydroxy-2-naphthoic acid used was replaced by the following toning agent A, C or D.

Toning agent A: 2,2'-dihydroxy-1,1'-dinaphthylmethane-3,3'-dicarboxylic acid

Toning agent C: 2,2'-dihydroxy-1,1'-dinaphthylmethane

Toning agent D: 2,2'-dihydroxy-1,1'-dinaphthylmethane -6,6'-dicarboxylic acid

The toning effects of the resulting pigments were evaluated as in Example 1, and the results are shown in Table 6a.

TABLE 6a

| Run No. | Toning agent | wt. % of the toning agent | Mass tone | Tint | Transparency |
|---|---|---|---|---|---|
| 1 | None | — | Standard | Standard | Standard |
| 2 | C | 1.0 | Fairly dark | Fairly blue | Fairly transparent |
| 3 | C | 2.0 | Very dark | Very blue | Very transparent |
| 4 | D | 2.0 | Very dark | Very blue | Very transparent |
| 5 | A + D (1:1) | 2.0 | Very dark | Very blue | Very transparent |

The dominant wavelengths, lightnesses and excitation purities of the pigments obtained in Runs Nos. 1, 2 and 3 were measured, and the results are shown in Table 6b.

TABLE 6b

| Run No. | λd (nm) | Y (%) | Pe (%) |
| --- | --- | --- | --- |
| 1 | 493.9 C | 7.4 | 54.1 |
| 2 | 494.2 C | 6.1 | 59.1 |
| 3 | 495.0 C | 4.6 | 70.6 |

EXAMPLE 7

A calcium salt of Watchung Red was produced in the same way as in Example 3.

Toned pigments were produced by operating in the same way as in the above pigment production except that 1% by weight or 2% by weight of 3-hydroxy-2-naphthoic acid was replaced by the toning agents described in Example 6.

The toning effect of the resulting pigments were evaluated as in Example 1, and the result are shown in Table 7a.

TABLE 7a

| Run No. | Toning agent | wt. % of the toning agent | Mass tone | Tint | Transparency |
| --- | --- | --- | --- | --- | --- |
| 1 | None | — | Standard | Standard | Standard |
| 2 | C | 1.0 | Fairly dark | Fairly blue | Fairly transparent |
| 3 | C | 2.0 | Very dark | Very blue | Very transparent |
| 4 | D | 2.0 | Very dark | Very blue | Very transparent |
| 5 | A + D (1:1) | 2.0 | Very dark | Very blue | Very transparent |

The dominant wavelengths, lightnesses and excitation purities of the pigments obtained in Runs Nos. 1, 2 and 3 were measured, and the results are shown in Table 7b.

TABLE 7b

| Run No. | λd (nm) | Y (%) | Pe (%) |
| --- | --- | --- | --- |
| 1 | 494.0 C | 7.2 | 60.3 |
| 2 | 494.6 C | 5.7 | 68.5 |
| 3 | 495.1 C | 4.3 | 75.0 |

EXAMPLE 8

A calcium salt of Brilliant Carmine 6B was produced in the same way as in Example 1, (a).

Toned pigments were produced by operating in the same way as in the above pigment production except that 2% by weight of 3-hydroxy-2-naphthoic acid was replaced by a mixture of 4,4'-dihydroxy-1,1'-dinaphthylmethane, 1,1'-dihydroxy-2,2'-dinaphthylmethane and 1,4'-dihydroxy-2,1'-dinaphthylmethane.

The toning effects of the resulting pigments were evaluated as in Example 1, and the results are shown in Table 8.

TABLE 8

| Toning agent (wt. %) | Mass tone | Tint | Transparency |
| --- | --- | --- | --- |
| — | Standard | Standard | Standard |
| 2.0 | Very dark | Very blue | Very transparent |

TABLE 8-continued

| Toning agent (wt. %) | Mass tone | Tint | Transparency |
| --- | --- | --- | --- |
| | | | transparent |

REFERENTIAL EXAMPLE 2

Production of bis-naphthylmethanes:

[I] 26.3 g of 3-hydroxy-N-phenyl-2-naphthalenecarboxamide was added to 1300 g of water containing 8.2 g of sodium hydroxide. The mixture was heated at 90° C. to form a solution. To the solution was added 4.1 g of an aqueous solution of formaldehyde, and the mixture was heated at 90° C. for 5 hours. After the reaction, the crystals that separated out were collected by hot filtration, washed with water and dried to give 16.2 g of 2,2'-dihydroxy-1,1'-dinaphthylmethane-3,3'-di-N-phenylcarboxamide (purity 99.8%).

[II] 27.7 g of 3-hydroxy-N-(2-methylphenyl)-2-naphthalenecarboxamide was added to 280 g of water containing 8.2 g of sodium hydroxide. The mixture was heated at 90° C. to form a solution. To this solution was added 4.1 g of an aqueous solution of formaldhyde, and the resulting mixture was heated at 90° C. for 5 hours. After the reaction, the crystals that separated out were collected by hot filtration, washed with water, and dried to give 25.0 g of 2,2'-dihydroxy-1,1'-dinaphthylmethane-3,3'-di-N-(2-methylphenyl)carboxamide (purity 98.2%).

EXAMPLE 9

(a) 12 g of 6-aminotoluenesulfonic acid was dissolved in 200 ml of water containing 2.8 g of sodium hydroxide. To the solution was added 15 g of 35% hydrochloric acid to form a precipitate. A solution of 4.4 g of sodium nitrite in 20 ml of water was added dropwise to the solution while maintaining it at 0° C. The mixture was stirred for 1 hour to diazotize 6-amino-m-toluenesulfonic acid, and a solution of its diazonium salt was obtained. Separately, 12.2 g of 3-hydroxy-2-naphthoic acid was dissolved in 150 ml of water containing 7.3 g of sodium hydroxide. The above diazonium salt solution was gradually added to the solution while maintaining at 0° C. The mixture was stirred for 2 hours to perform coupling. After the reaction, 70 ml of water was added to the reaction mixture, and the pH of the mixture was adjusted to 8.0 to 8.5 with a 10% aqueous solution of acetic acid. The solution was then maintained at 18° C., and a solution of 9.1 g of calcium chloride in 40 ml of water was added to it. The mixture was heated at 90° C., and stirred for 30 minutes. The precipitate was then filtered out, washed with water, and dried to give a calcium salt of Brilliant Carmine 6B.

(b) A toned pigment was produced in the same way as in (a) above except that 3-hydroxy-2-naphthoic acid containing 2% by weight of 3-hydroxy-2-naphthoic acid was replaced by 2,2'-dihydroxy-1,1'-dinaphthylmethane-3,3'-di-N-phenylcarboxamide (toning agent E).

(c) A toned pigment was produced by operating in the same way as in (a) above except that 2% by weight of 3-hydroxy-2-naphthoic acid was replaced by 2,2'-dihydroxy-1,1'-dinaphthylmethane-3,3'-di-N-(2-methylphenyl)carboxamide (toning agent F).

The toning effects of the pigments were evaluated in the same way as in Example 1. The dominant wavelengths, lightnesses and excitation purities of the pigments were measured. The results are shown in Table 9.

TABLE 9

| Toning agent | wt. % of the toning agent | λd (nm) | Y (%) | Pe (%) | Mass tone | Tint |
|---|---|---|---|---|---|---|
| None | — | 494.1 C | 6.7 | 62.0 | Standard | Standard |
| E | 2.0 | 494.6 C | 5.4 | 66.1 | Very dark | Moderately more blue |
| F | 2.0 | 494.8 C | 5.6 | 67.2 | Extremely dark | Much more blue |

EXAMPLE 10

A calcium salt of Watchung Red was produced by coupling a diazonium salt of 6-amino-4-chloro-m-toluenesulfonic acid with 3-hydroxy-2-naphthoic acid by operating in the same way as in Example 1, (a).

A toned pigment was produced by operating in the same way as in the above pigment production except that 2% by weight of 3-hydroxy-2-naphthoic acid was replaced by 2,2'-dihydroxy-1,1'-dinaphthylmethane-3,3'-di-N-phenylcarboxamide.

The toning effects of the pigments were evaluated as in Example 1, and the dominant wavelengths, lightnesses and excitation purities of the pigments were measured. The results are shown in Table 10.

TABLE 10

| Toning agent (wt. %) | λd (nm) | Y | Pe | Mass tone | Tint |
|---|---|---|---|---|---|
| — | 494.3 C | 6.5 | 65.1 | Standard | Standard |
| 2.0 | 495.0 C | 5.0 | 70.3 | Extremely dark | Much more blue |

REFERENTIAL EXAMPLE 3

Production of bis-naphthylmethanes:

[I] 12 g of 6-amino-m-toluenesulfonic acid was dissolved in 200 ml of water containing 2.8 g of sodium hydroxide. To the solution was added 15 g of 35% hydrochloric acid to form a precipitate. A solution of 4.4 g of sodium nitrite in 20 ml of water was added dropwise to the solution while maintaining it at 0° C. The mixture was stirred for 1 hour to diazotize the 6-amino-m-toluenesulfonic acid, and a solution of its diazonium salt was obtained. Separately, 8.6 g of 2,2'-dihydroxy-1,1'-dinaphthylmethane was dissolved in 150 ml of water containing 7.3 g of sodium hydroxide. The diazonium salt solution obtained as above was gradually added to the solution while maintaining it at 0° C. The mixture was stirred for 2 hours to perform coupling. After the reaction, 70 ml of water was added to the reaction solution, and the pH of the solution was adjusted to 8.0 to 8.5 with a 10% aqueous solution of acetic acid. Then, a solution of 9.1 g of calcium chloride in 40 ml of water was added to the solution while maintaining it at 18° C. The mixture was heated at 90° C., and stirred for 30 minutes. The precipitate was filtered, washed with water, and dried to give 19.4 g of a coupling product (azo compound) from 6-amino-m-toluenesulfonic acid and 2,2'-dihydroxy-1,1'-dinaphthylmethane.

[II] 18.0 g of a coupling product (azo compound) from 6-amino-m-toluenesulfonic acid and 2,2'-dihydroxy-1,1'-dinaphthylmethane -3,3'-dicarboxylic acid was produced by operating in the same way as in [I] above except that 10.3 g of 2,2'-dihydroxy-1,1'-dinaphthylmethane-3,3'-dicarboxylic acid was used instead of 18.6 g of 2,2'-dihydroxy-1,1'-dinaphthylmethane.

[III] 20.3 g of a coupling product (azo compound) from 6-amino-4-chloro-m-toluenesulfonic acid and 2,2'-dihydroxy-1,1'-dinaphthylmethane was produced by operating in the same way as in [I] above except that 6-amino-4-chloro-m-toluenesulfonic acid was used instead of 6-amino-m-toluenesulfonic acid.

[IV] 18.9 g of a coupling product (azo compound) from 6-amino-4-chloro-m-toluenesulfonic acid and 2,2'-dihydroxy-1,1'-dinaphthylmethane-3,3'-dicarboxylic acid (azo compound) was produced by operating in the same way as in [II] above except that 6-amino-4-chloro-m-toluenesulfonic acid was used instead of 6-amino-m-toluenesulfonic acid.

EXAMPLE 11

(a) 12 g of 6-amino-m-toluenesulfonic acid was dissolved in 200 ml of water containing 2.8 g of sodium hydroxide. To the solution was added 15 g of 35% hydrochloric acid to form a precipitate. A solution of 4.4 g of sodium nitrite in 20 ml of water was added dropwise to the solution while maintaining it at 0° C. The mixture was stirred for 1 hour to diazotize 6-amino-m-toluenesulfonic acid, and a solution of its diazonium salt was obtained. Separately, 12.2 g of 3-hydroxy-2-naphthoic acid was dissolved in 150 ml of water containing 7.3 g of sodium hydroxide. The solution was maintained at 0° C., and the diazonium salt solution obtained above was gradually added to it. The mixture was stirred for 2 hours to perform coupling. After the reaction, 70 ml of water was added to the reaction mixture, and the pH of the solution was adjusted to 8.0 to 8.5 with a 10% aqueous solution of acetic acid. Then, the solution was maintained at 18° C., and a solution of 9.1 g of calcium chloride in 40 ml of water was added to it. The mixture was heated at 90° C. and stirred for 30 minutes. The resulting precipitate was filtered, washed with water and dried to give a calcium salt of Brilliant Carmine 6B.

(b) A toned pigment was produced in the same way as in (a) above except that 2% by weight of 3-hydroxy-2-naphthoic acid was replaced by a coupling product formed between 6-amino-m-toluenesulfonic acid and 2,2'-dihydroxy-1,1'-dinaphthylmethane (toning agent G).

(c) A toned pigment was produced in the same way as in (a) above except that 2% by weight of 3-hydroxy-2-naphthoic acid was replaced by a coupling product formed between 6-amino-m-toluenesulfonic acid and 2,2'-dihydroxy-1,1'-dinaphthylmethane-3,3'-dicarboxylic acid (toning agent H).

(d) The toning effects of the resulting pigments were evaluated in the same way as in Example 1, and the results are shown in Table 11.

TABLE 11

| Toning agent | Wt. % of the toning agent | Mass tone | Tint | Transparency |
|---|---|---|---|---|
| None | — | Standard | Standard | Standard |
| G | 2.0 | Slightly dark | Slightly blue | Slightly transparent |
| H | 2.0 | Slightly dark | Slightly blue | Slightly transparent |

Example 12

(a) 12 g of 6-amino-4-cloro-m-toluenesulfonic acid was dissolved in 200 ml of water containing 2.8 g of sodium hydroxide. To the solution was added 15 g of 35% hydrochloric acid to form a precipitate. A solution of 4.4 g of sodium nitrite in 20 ml of water was added dropwise to the solution while maintaining it at 0° C. The mixture was stirred for 1 hour to diazotize 6-amino-m-toluenesulfonic acid, and a solution of its diazonium salt was obtained. Separately, 12.2 g of 3-hydroxy-2-naphthoic acid was dissolved in 150 ml of water containing 7.3 g of sodium hydroxide. The solution was maintained at 0° C., and the diazonium salt solution obtained above was gradually added to it. The mixture was stirred for 2 hours to perform coupling. After the reaction, 70 ml of water was added to the reaction solution, and the pH of the solution was adjusted to 8.0 to 8.5 with a 10% aqueous solution of acetic acid. Then, the solution was maintained at 18° C., and a solution of 9.1 g of calcium chloride in 40 ml of water was added to it. The mixture was heated to 90° C., stirred for 30 minutes, filtered, washed with water, and dried to give a calcium salt of Watchung Red.

(b) A toned pigment was produced in the same way as in (a) above except that 2% by weight of 3-hydroxy-2-naphthoic acid was replaced by a coupling product formed between 6-amino-4-chloro-m-toluenesulfonic acid and 2,2'-dihydroxy-1,1'-dinaphthylmethane (toning agent I).

(c) A toned pigment was produced in the same way as in (a) above except that 2% by weight of 3-hydroxy-2-naphthoic acid was replaced by a coupling product formed between 6-amino-4-chloro-m-toluenesulfonic acid and 2,2'-dihydroxy-1,1'-dinaphthylmethane-3,3'-dicarboxylic acid (toning agent J).

(d) The toning effects of the resulting pigments were evaluated in the same way as in Example 1, and the results are shown in Table 12.

TABLE 12

| Toning agent | Wt. % of the toning agent | Mass tone | Tint | Transparency |
|---|---|---|---|---|
| None | — | Standard | Standard | Standard |
| I | 2.0 | Slightly dark | Slightly blue | Slightly transparent |
| J | 2.0 | Slightly dark | Slightly blue | Slightly transparent |

What is claimed is:

1. A process for producing an azo pigment, which comprises coupling an aromatic diazonium compound with 3-hydroxy-2-naphthoic acid and at least one bis-naphthylmethane, and optionally, laking the resulting pigment.

2. The process of claim 1 wherein the bis-naphthylmethane has a basic skeleton represented by the general formula

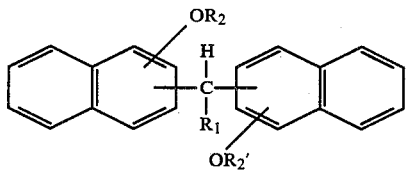

[I]

wherein $R_1$, $R_2$ and $R_2'$, independently from each other, represent a hydrogen atom or an alkyl group having not more than 5 carbon atoms.

3. The process of claim 2 wherein the bis-naphthylmethane having the basic skeleton of general formula I is at least one compound selected from the group consisting of compounds of the following general formulae

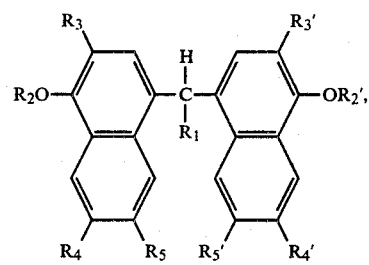

[II]

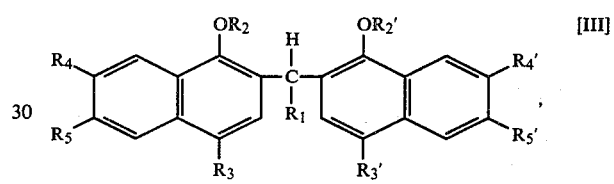

[III]

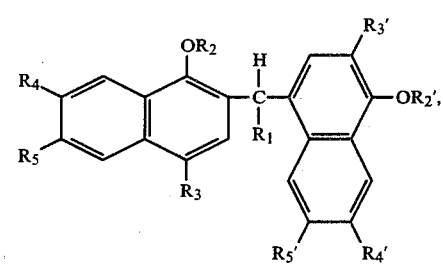

[IV]

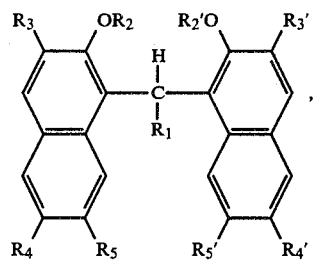

[V]

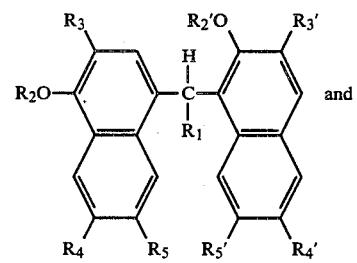

[VI]

and

-continued

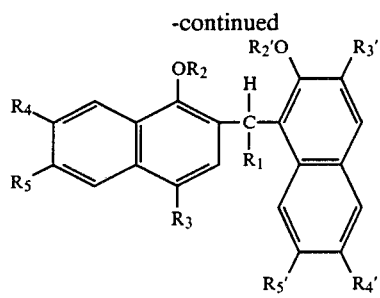  [VII]

wherein R₁, R₂ and R₂', independently from each other, represent a hydrogen atom or an alkyl group having not more than 5 carbon atoms, R₃ and R₃', independently from each other, represent a hydrogen atom, a halogen atom, an alkyl group having not more than 5 carbon atoms, an alkoxycarbonyl group with the alkyl moiety having not more than 5 carbon atoms, a carboxyl group, a nitro group, a sulfone group or a group of the formula —CONH—R₆ in which R₆ represents the group

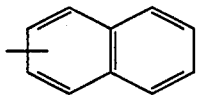

or the group

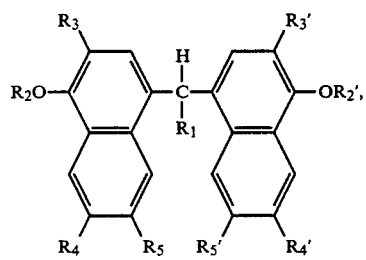

where R₇, R₈ and R₉, independently from each other, represent a hydrogen atom, a halogen atom, an alkyl group having not more than 5 carbon atoms, an alkoxy and an alkoxycarbonyl groups with the alkyl moiety having not more than 5 carbon atoms, a carboxyl group, a nitro group or a sulfone group; and R₄, R₄', R₅ and R₅', independently from each other, represent a hydrogen atom, a halogen atom, an alkyl group having not more than 5 carbon atoms, an alkoxycarbonyl group with the alkyl moiety having not more than 5 carbon atoms, a carboxyl group, a nitro group or a sulfone group.

4. The process of claim 2 wherein the bis-naphthylmethane having the basic skeleton of general formula (I) is an azo compound obtained by coupling a diazonium compound with at least one compound selected from the group consisting of compounds of the general formulae

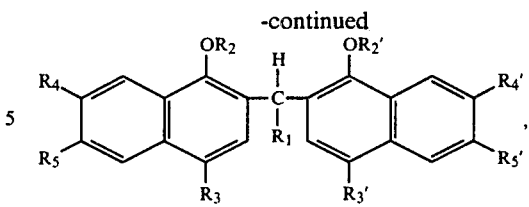  [III]

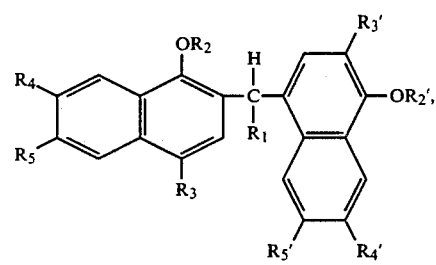  [IV]

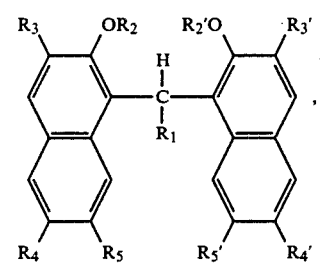  [V]

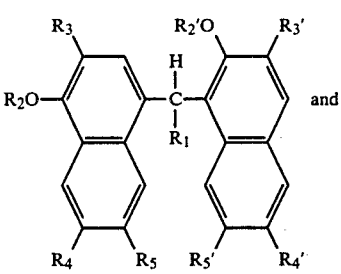  [VI]

and

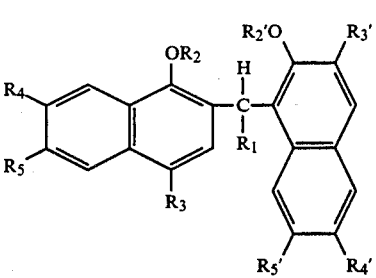  [VII]

wherein R₁, R₂ and R₂', independently from each other, represent a hydrogen atom or an alkyl group having not more than 5 carbon atoms, R₃ and R₃', independently from each other, represent a hydrogen atom, a halogen atom, an alkyl group having not more than 5 carbon atoms, an alkoxycarbonyl group with the alkyl moiety having not more than 5 carbon atoms, a carboxyl group, a nitro group, a sulfone group or a group of the formula —CONH—R₆ in which R₆ represents the group

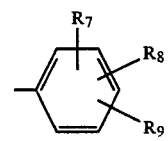

or the group

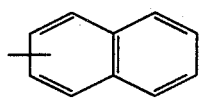

where $R_7$, $R_8$ and $R_9$, independently from each other, represent a hydrogen atom, a halogen atom, an alkyl group having not more than 5 carbon atoms, an alkoxy and an alkoxycarbonyl group with the alkyl moiety having not more than 5 carbon atoms, a carboxyl group, a nitro group or a sulfone group; and $R_4$, $R_4'$, $R_5$ and $R_5'$, independently from each other, represent a hydrogen atom, a halogen atom, an alkyl group having not more than 5 carbon atoms, an alkoxycarbonyl group with the alkyl moiety having not more than 5 carbon atoms, a carboxyl group, a nitro group or a sulfone group.

* * * * *